US006678749B2

(12) United States Patent
Kolli et al.

(10) Patent No.: US 6,678,749 B2
(45) Date of Patent: Jan. 13, 2004

(54) SYSTEM AND METHOD FOR EFFICIENTLY PERFORMING DATA TRANSFER OPERATIONS

(75) Inventors: Praveen K. Kolli, Sunnyvale, CA (US); Harry Chue, Alameda, CA (US); Mitsuaki Shiraga, Saratoga, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 355 days.

(21) Appl. No.: 09/896,403

(22) Filed: Jun. 28, 2001

(65) Prior Publication Data

US 2003/0005185 A1 Jan. 2, 2003

(51) Int. Cl.[7] .............................................. G06F 3/00
(52) U.S. Cl. ............................. 710/5; 710/18; 710/52; 712/225
(58) Field of Search ...................... 710/5, 7, 18, 33, 710/52, 73, 129, 36; 709/201, 212, 250; 712/10, 29, 225

(56) References Cited

U.S. PATENT DOCUMENTS

| | | | | |
|---|---|---|---|---|
| 4,466,079 A | * | 8/1984 | Daniels et al. ............... 705/407 |
| 5,274,795 A | * | 12/1993 | Vachon ........................ 395/500 |
| 5,530,893 A | * | 6/1996 | Sugi ............................... 710/5 |
| 5,574,944 A | * | 11/1996 | Stager ............................. 710/5 |
| 6,363,439 B1 | * | 3/2002 | Battles et al. ................. 710/36 |
| 6,442,475 B1 | * | 8/2002 | Utsui et al. ................. 701/200 |

* cited by examiner

Primary Examiner—Kim Huynh
Assistant Examiner—Rijue Mai
(74) Attorney, Agent, or Firm—Gregory J Koerner; Simon & Koerner LLP (57) ABSTRACT

An apparatus and method for efficiently performing data transfer operations in an electronic system preferably includes a plurality of buffers that may store data and commands during execution of data transfer operations. Initially, at least a portion of a plurality of commands defining data transfer operations between a memory and peripheral devices may be temporarily stored in a command buffer associated with a processor interface. The processor interface may then issue commands directly to a memory interface, peripheral devices, and peripheral interfaces within the electronic system. Commands received by the memory interface may be temporarily stored in a command buffer associated with the memory interface. When a memory associated with the memory interface is ready, the memory interface may access the memory, and transfer data to or from one or more buffers associated with a peripheral device. Once the data is transferred to or from the buffers, then the memory interface may execute other commands stored in the command buffer. Execution of the first command does not have to be completed before the execution of a second command begins.

24 Claims, 9 Drawing Sheets

SYSTEM AND METHOD FOR EFFICIENTLY PERFORMING DATA TRANSFER OPERATIONS

BACKGROUND SECTION

1. Field of the Invention

This invention relates generally to techniques for managing data, and relates more particularly to a system and method for efficiently performing data transfer operations.

2. Description of the Background Art

Implementing efficient methods for transferring data is a significant consideration for designers and manufacturers of contemporary electronic devices. However, efficiently transferring data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced transfer operations may provide additional benefits to a system user, but may also place increased demands on the control and management of various device components. For example, an enhanced electronic device that transfers digital image data may benefit from an effective implementation because of the large amount and complexity of the digital data involved.

In certain contemporary environments, complex or lengthy data transfer operations may often consume substantial amounts of available system resources to the detriment of other system functionalities. For example, a system central processing unit may operate at a faster rate than other device components. This disparity in operating speeds may make it difficult for the other device components to perform one or more data transfer operations at a speed that compliments the central processing unit and does not slow down the overall operations of the central processing unit and electronic system.

Due to growing demands on system resources and substantially increasing data magnitudes, it is apparent that developing new techniques for transferring data is a matter of concern for related electronic technologies. Therefore, for all the foregoing reasons, developing efficient systems for transferring data remains a significant consideration for designers, manufacturers, and users of contemporary electronic devices.

SUMMARY

In accordance with the present invention, an apparatus and method are disclosed for efficiently performing data transfer operations in an electronic system. In one embodiment, a central processing unit may preferably issue one or more commands to a central processing unit (CPU) interface. The CPU interface may temporarily store the one or more commands into a command buffer. The CPU interface may also temporarily store any data to be written to a device into a write buffer, and may store any data to be read from a device into a read buffer. The CPU interface may then issue each command from the command buffer to a peripheral or peripheral interface when the corresponding peripheral or peripheral interface is ready.

In another embodiment of the invention, one or more commands may be temporarily stored in a command buffer associated with a memory interface. The one or more commands may be received from the CPU interface, one or more peripheral interfaces, and one or more peripheral devices. When a command is executed, data corresponding to the command may be temporarily stored in one or more buffers associated with a receiving device. When the receiving device is ready, the data temporarily stored in the buffers may be transferred to the device.

In yet another embodiment of the present invention, a command count may be incremented in response to the issuance of a command. When each command is executed, the command count may be decremented. This provides the system with a command count of the number of outstanding commands that have yet to be executed.

The commands stored in the command buffers associated with the CPU interface and the memory interface may be executed in any appropriate order. The commands may be executed in a first-in-first-out order, or the commands may be prioritized and executed in a sequence that optimizes system operations.

In accordance with the present invention, the central processing unit may therefore advantageously issue multiple commands to the CPU interface regardless of the ready state of the devices involved in each command. When a peripheral or peripheral interface is receptive, a command may be issued to the peripheral or peripheral interface, and temporarily stored until the corresponding device is able to execute the command. Temporarily storing one or more commands in command buffers associated with a memory interface allows the memory interface to set up and execute multiple commands in a more expeditious manner. Additionally, temporarily storing data in buffers during data transfer operations allows the devices in the electronic system to transfer data in a continuous and uninterrupted flow, thereby allowing the electronic system to operate in a more efficient manner.

DETAILED DESCRIPTION

The present invention relates to an improvement in data transfer techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises an apparatus and method for efficiently performing data transfer operations in an electronic system, and preferably includes a plurality of buffers that may store data and commands. Initially, at least a portion of a plurality of commands defining data transfer operations between a memory, peripheral interfaces, and peripheral devices may be temporarily stored in a command buffer associated with a processor interface. The processor interface may then issue commands directly to a memory interface, peripheral devices and peripheral interfaces within the electronic system.

Commands received by the memory interface may be temporarily stored in a command buffer associated with the memory interface. When a memory associated with the memory interface is ready, the memory interface may access the memory and transfer data to at least one buffer associated with the receiving peripheral device. When the peripheral device is ready, the data stored in the buffers may be transferred to the peripheral. Alternatively, the memory interface may access at least one buffer associated with a peripheral or peripheral interface, and transfer data to the memory. Once the data is transferred to or from the buffer, then the memory interface may execute other commands that may be stored in the command buffer associated with the memory interface. Execution of the first command does not have to be completed before the execution of a second command begins.

Figure 1:
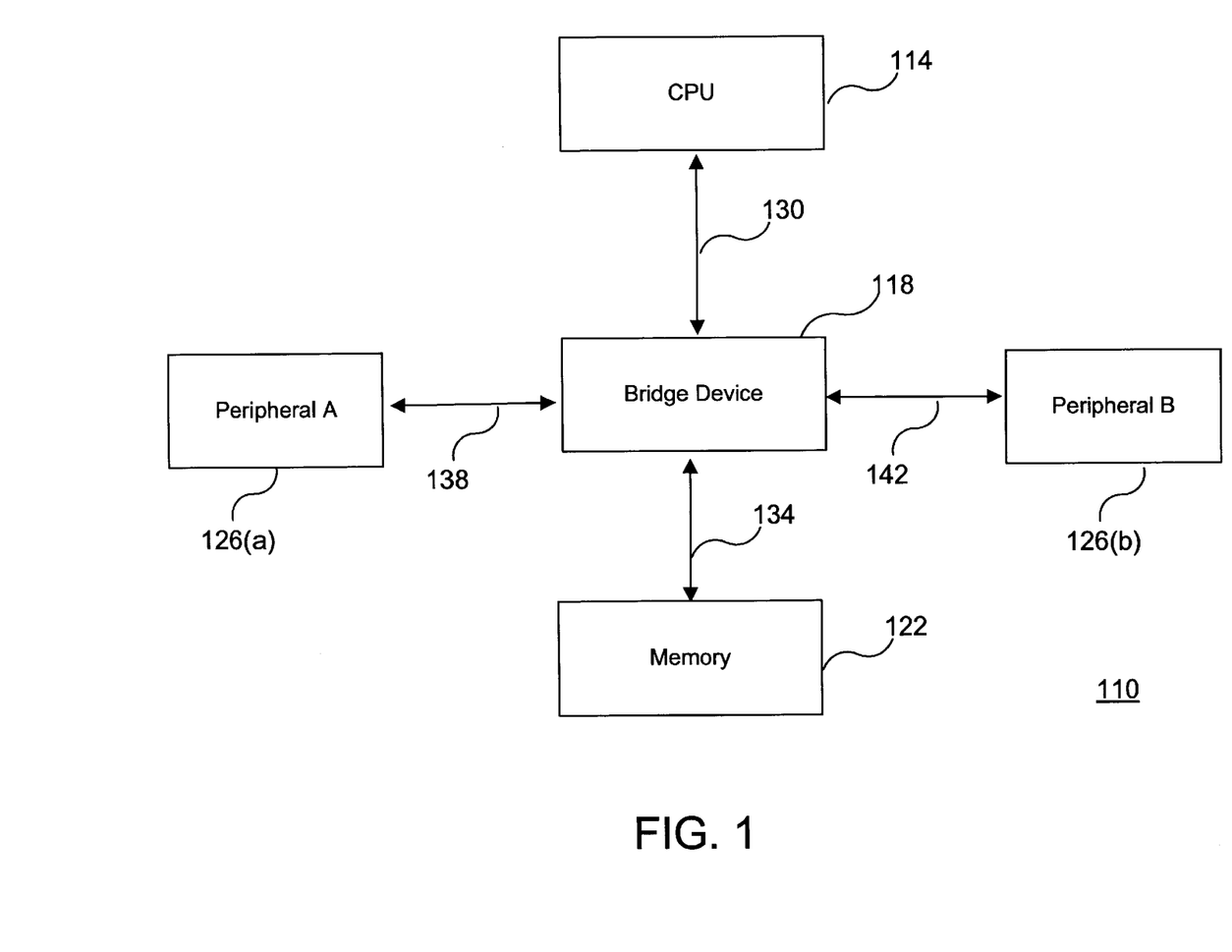
FIG. 1 is a block diagram for one embodiment of an electronic system, in accordance with the present invention.

Referring now to FIG. 1, a block diagram for one embodiment of an electronic system 110 is shown, in accordance with the present invention. In the FIG. 1 embodiment, electronic system 110 may preferably include, but is not limited to, a central processing unit (CPU) 114, a bridge device 118, a memory 122, a peripheral A 126(a), and a peripheral B 126(b). In alternate embodiments, electronic system 110 may readily include various other elements or functionalities in addition to, or instead of, those elements or functionalities discussed in conjunction with the FIG. 1 embodiment. Furthermore, electronic system 110 may be implemented and configured in any desired manner. For example, electronic system 110 may be implemented as one or more integrated circuit devices, as a audio/visual electronic device, as a consumer electronics device, as a portable electronic device, or as a computer device.

In the FIG. 1 embodiment, CPU 114 may preferably be implemented as any appropriate and effective processor device or microprocessor to thereby control and coordinate the operation of electronic system 110 in response to various software program instructions. Bridge device 118 may communicate with CPU 114 via path 130, and may preferably include one or more interfaces for bidirectionally communicating with other devices or entities in electronic system 110. One embodiment of bridge device 118 is further discussed below in conjunction with FIG. 2.

In the FIG. 1 embodiment, memory 122 may bidirectionally communicate with bridge device 118 via path 134. Memory 122 may be implemented by utilizing any desired technologies or configurations. For example, in certain embodiments, memory 122 may preferably be implemented as a memory device that is optimized for performing block transfers of various data.

In accordance with the present invention, bridge device 118 may also bidirectionally communicate with various peripheral devices in electronic system 110. In the FIG. 1 embodiment, bridge device 118 may preferably communicate with a peripheral A 126(a) via path 138, and may also preferably communicate with a peripheral B 126(b) via path 142. In alternate embodiments, bridge device 118 may readily communicate with any desired number of peripheral devices in addition to, or instead of, those peripheral devices 126 that are presented and discussed in conjunction with the FIG. 1 embodiment.

Figure 2:
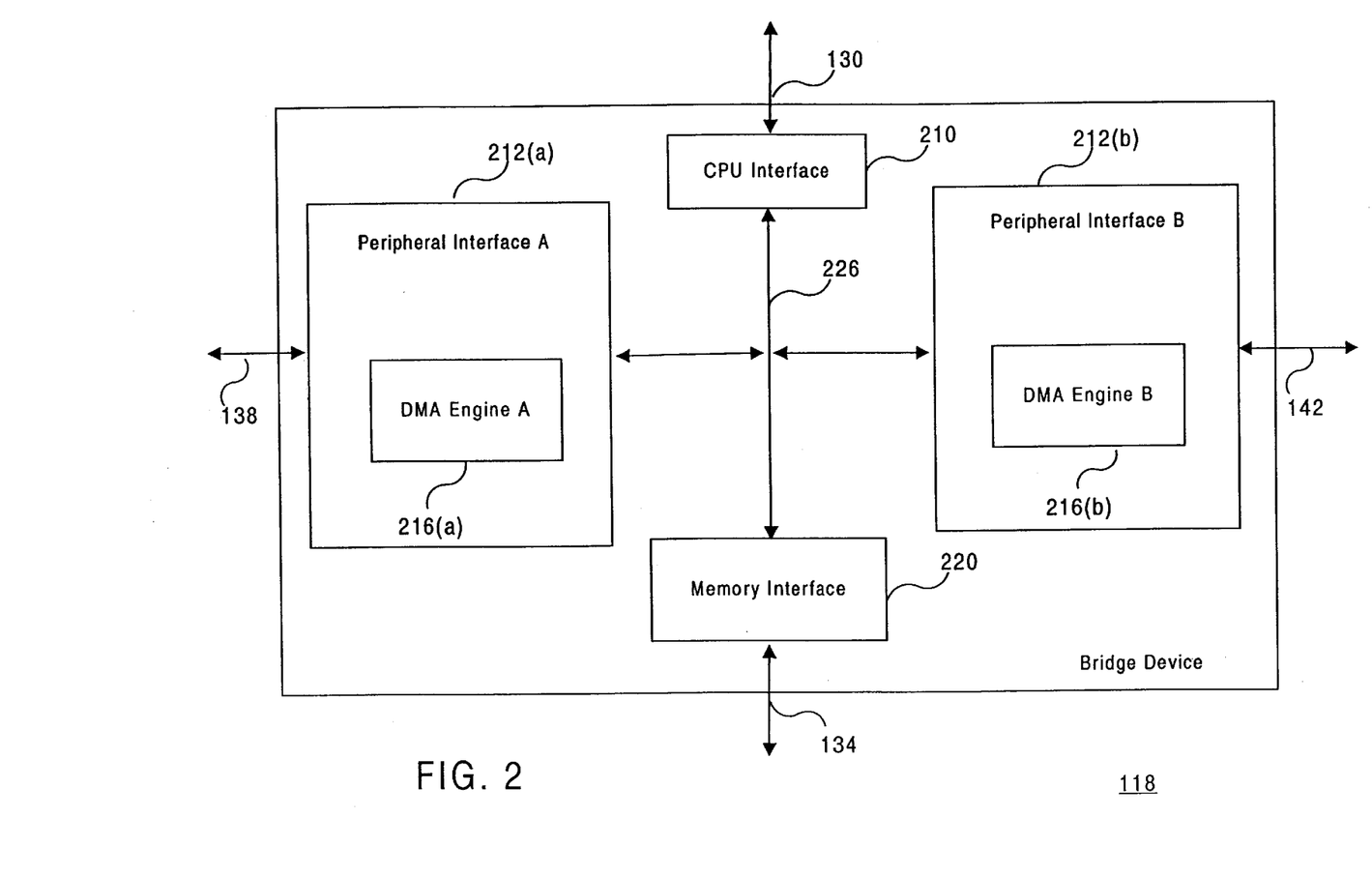
FIG. 2 is a block diagram for one embodiment of the bridge device of FIG. 1, in accordance with the present invention.

Referring now to FIG. 2, a block diagram for one embodiment of the FIG. 1 bridge device 118 is shown, in accordance with the present invention. In the FIG. 2 embodiment, bridge device 118 may preferably include, but is not limited to, a CPU interface 210, a peripheral interface A 212(a), a peripheral interface B 212(b), a DMA engine A 216(a), a DMA engine B 216(b), and a memory interface 220. In alternate embodiments, bridge device 118 may readily include various other elements or functionalities in addition to, or instead of, those elements or functionalities discussed in conjunction with the FIG. 2 embodiment. In addition, bridge device 118 may be implemented in any appropriate manner. For example, in certain embodiments, bridge device 118 may be implemented as a separate integrated circuit device in electronic system 110.

In the FIG. 2 embodiment, CPU 114 may communicate with bridge device 118 through a CPU interface 210. Similarly, memory 122 may communicate with bridge device 118 through a memory interface 220. In addition, peripheral A 126(a) may communicate with bridge device 118 through a peripheral interface A 212(a), and peripheral B 126(b) may communicate with bridge device 118 through a peripheral interface B 212(b). Bridge device 118 may preferably also include a bridge bus 226 to enable various components and devices in electronic system 110 to effectively communicate through bridge device 118.

In the FIG. 2 embodiment, peripheral interface A 212(a) may preferably be associated with a DMA engine A 216(a) for performing a direct memory access (DMA) data transfer operation between peripheral A 126(a) and memory 122. Similarly, peripheral interface B 212(b) may preferably be associated with a DMA engine B 216(b) for performing a DMA data transfer operation between peripheral B 126(b) and memory 122. In the FIG. 2 embodiment, the two DMA engines 216 are shown as being integral with respective peripheral interfaces 212. However, in alternate embodiments, the DMA engines 216 of bridge device 118 may be implemented in any suitable location or manner. The configuration of DMA engines 216 is further discussed below in conjunction with FIG. 4.

Figure 3:
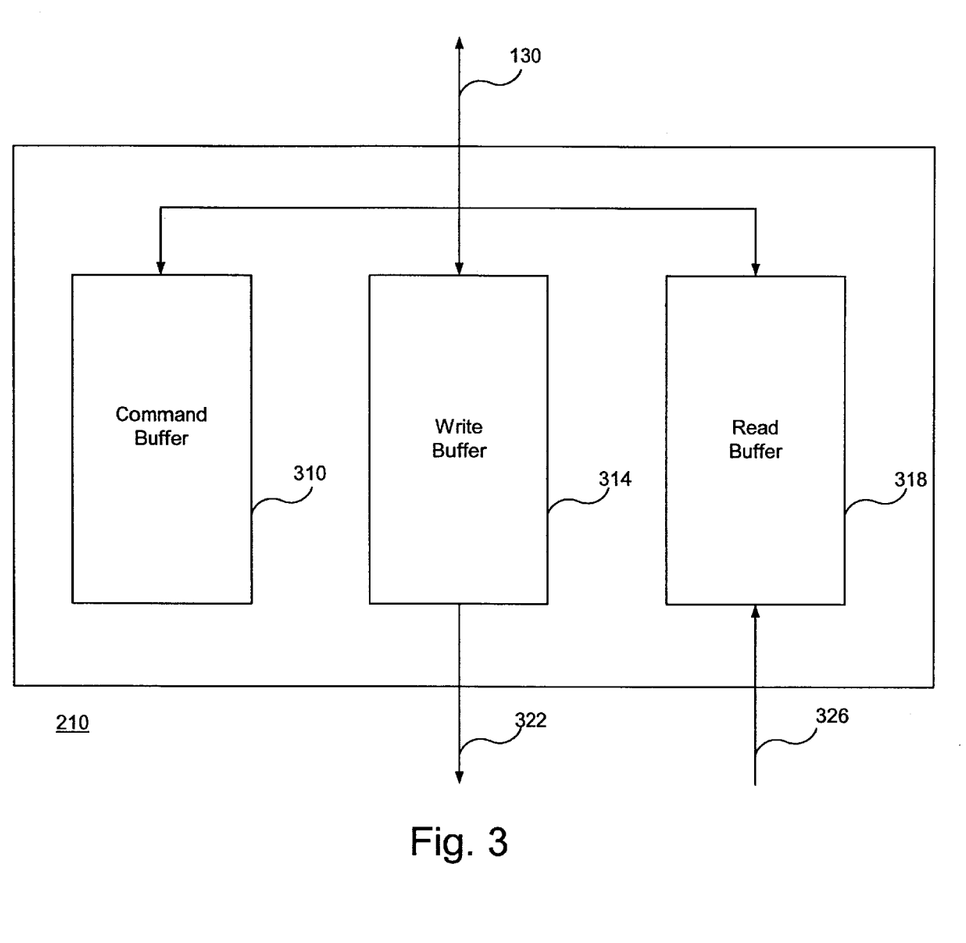
FIG. 3 is a block diagram for one embodiment of the CPU interface of FIG. 2, in accordance with one embodiment of the present invention.

Referring now to FIG. 3, a block diagram for one embodiment of the CPU interface 210 of FIG. 2 is shown, in accordance with one embodiment of the present invention. In the FIG. 3 embodiment, CPU interface 210 may preferably include, but is not limited to, a command buffer 310, a write buffer 314, and a read buffer 318. In alternate embodiments, CPU interface 210 may readily include various other elements or functionalities in addition to, or instead of, those elements or functionalities discussed in conjunction with the FIG. 3 embodiment.

In the FIG. 3 embodiment, CPU interface 210 may preferably include various types of appropriate information for performing one or more data transfer operations in electronic system 110. In certain embodiments, CPU 114 may issue one or more commands that define a read operation or a write operation between CPU 114, memory 122, peripheral A 126(a), or peripheral B 126(b). The commands may preferably include an address, a size of the data to be transferred, and if the transfer operation includes a write command, the data to be written. The commands may be accepted by CPU interface 210 and then may preferably be directly issued to peripheral devices and peripheral interfaces by CPU interface 210.

The one or more commands issued by CPU 114 may preferably be stored in a command buffer 310. The commands stored in command buffer 514 may preferably be executed in any appropriate order. For example, the commands may be executed in a first-in-first-out order, or the commands may be prioritized and executed in a sequence that optimizes system operations.

Data may preferably be temporarily stored in write buffer 314 before being written to memory 122, peripheral A 126(a), peripheral B 126(b), or any other device in electronic system 110. Data may also preferably be temporarily stored in read buffer 318 before being sent to CPU 114. In certain embodiments, the size of command buffer 310, write buffer 314, and read buffer 318 may determine the number of commands and amount of data that may be stored in command buffer 310, write buffer 314, and read buffer 318. Furthermore, command buffer 310, write buffer 314, and read buffer 318 may be implemented in any appropriate manner. For example, command buffer 310, write buffer 314, and read buffer 318 may be implemented as first-in-first-out (FIFO) buffers, and may be constructed with one or more flip-flops, FIFO memories, or other components that may be utilized to temporarily store information.

In accordance with the present invention, CPU interface 210 may therefore advantageously store more than one write command or read command in command buffer 310. In addition, CPU interface 210 may store data associated with one or more write commands into write buffer 314, and may store data associated with one or more read commands into read buffer 318. When a device or device interface is receptive, a write command may be executed and the corresponding data stored in write buffer 314 may be transferred to the corresponding target device or device interface, via path 322. Similarly, a read command may be executed and the corresponding data may be transferred and stored in read buffer 318 via path 326. Electronic system 110 preferably does not have to wait for a first data transfer operation to finish before the execution of a second command begins. The devices in electronic system 110 are therefore able to transfer data in a continuous and uninterrupted flow, thereby permitting the electronic system 110 to operate in a more efficient manner.

Figure 4:
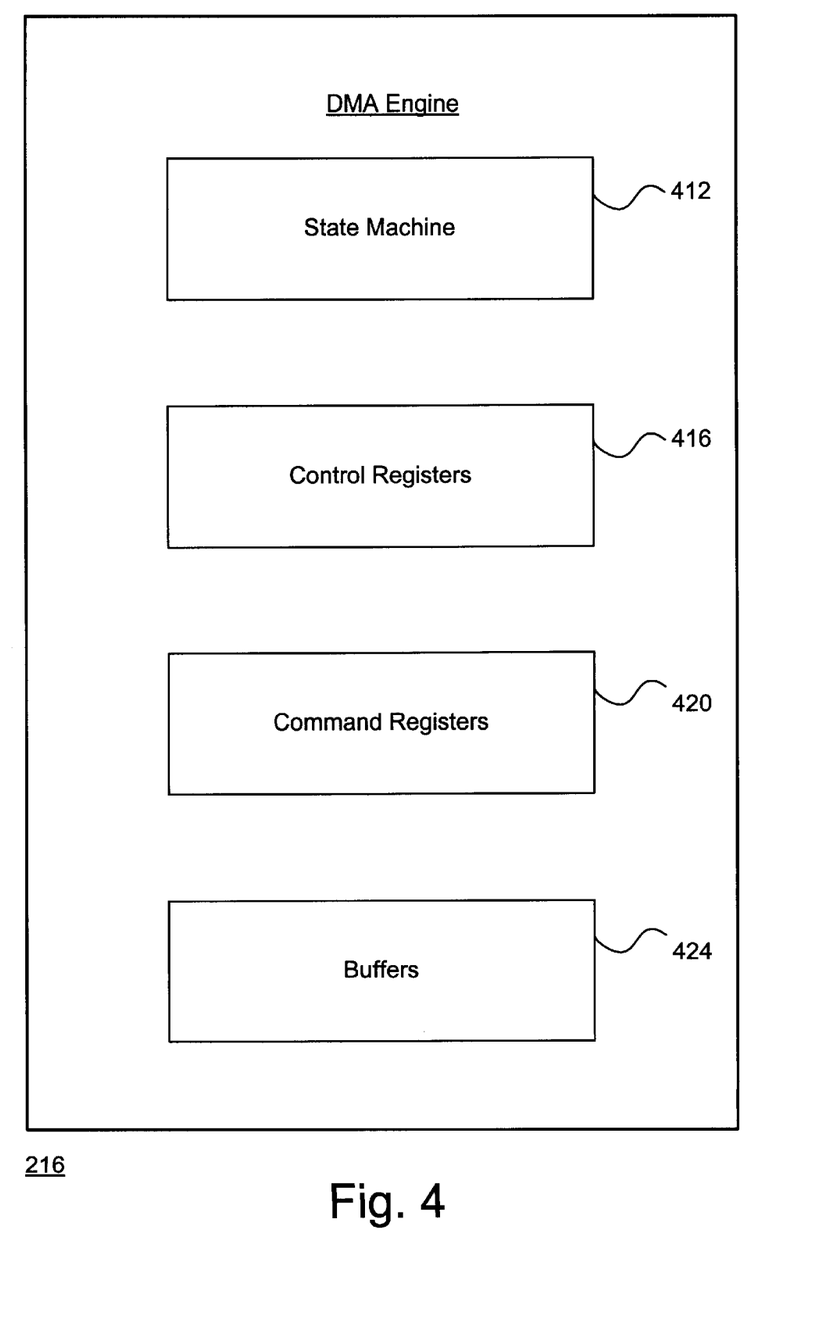
FIG. 4 is a block diagram of the DMA engines of FIG. 2, in accordance with one embodiment of the present invention.

Referring now to FIG. 4, a block diagram of the FIG. 2 DMA engine 216 is shown, in accordance with one embodiment of the present invention. In the FIG. 4 embodiment, DMA engine may be implemented as a transfer engine that preferably includes, but is not limited to, a state machine 412, one or more control registers 416, one or more command registers 420, and one or more buffers 424. In alternate embodiments, DMA engine 216 may readily include various other elements or functionalities in addition to, or instead of, those elements or functionalities discussed in conjunction with the FIG. 4 embodiment.

In the FIG. 4 embodiment, state machine 412 may include any appropriate and effective means for controlling the operation of DMA engine 216 to thereby perform various DMA data transfer operations. Control registers 416 may preferably include selected information that DMA engine may repeatedly require for performing various DMA data transfer operations. Command registers 420 may preferably include information from one or more command structures that may be copied into command registers 420 for local access by DMA engine 216 to perform corresponding DMA transfer operations. Buffers 424 may preferably store data during data transfer operations. The data may be transferred to a memory, memory interface, peripheral, or peripheral interface within electronic system 110. The functionality and utilization of buffers 424 is further discussed below in conjunction with FIG. 5.

Figure 5:
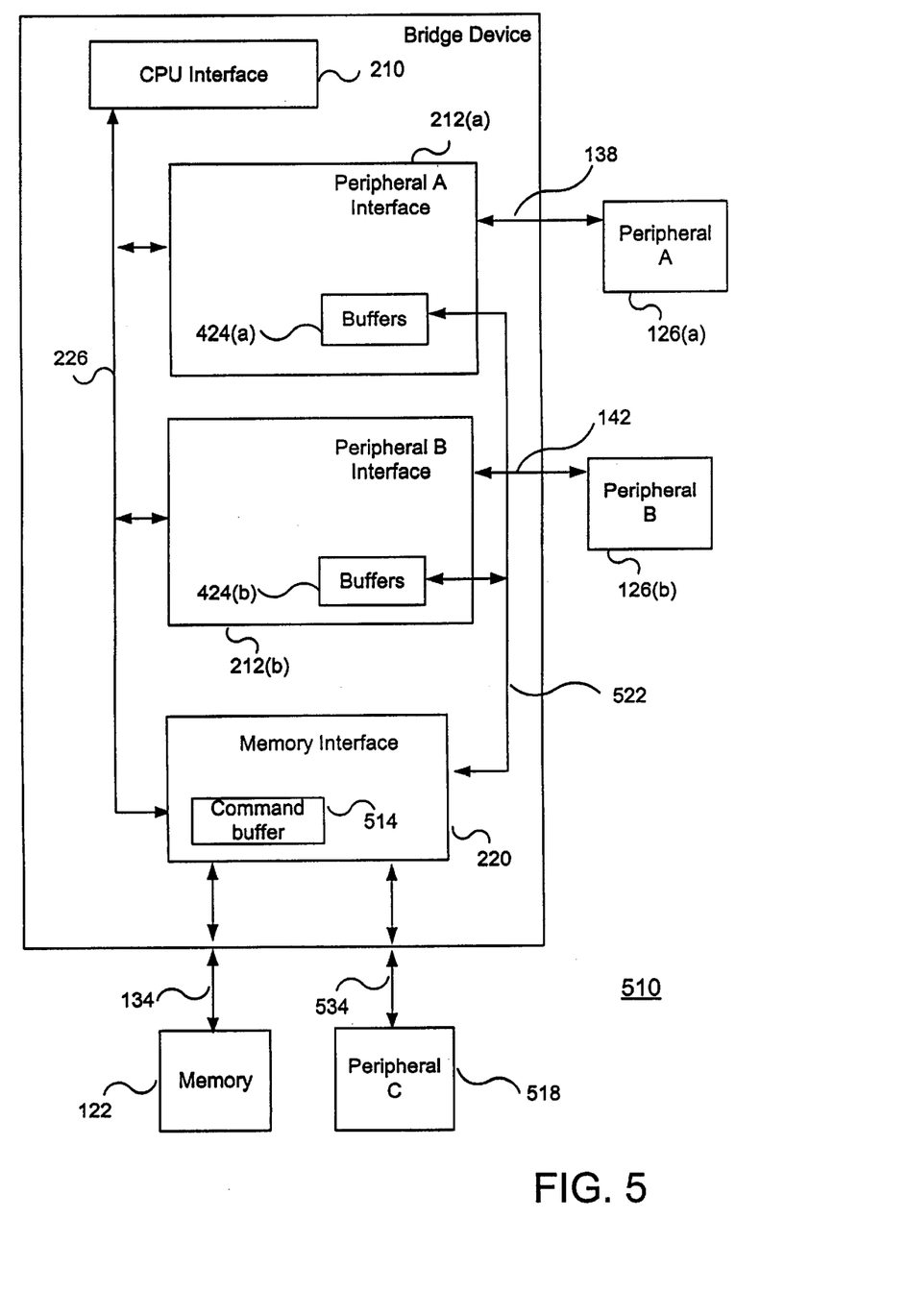
FIG. 5 is a block diagram illustrating a data transfer operation, in accordance with one embodiment of the present invention.

Referring now to FIG. 5, a block diagram illustrating a data transfer operation 510 is shown, in accordance with one embodiment of the present invention. In the FIG. 5 embodiment, data transfer operation 510 may preferably utilize, but is not limited to, a CPU interface 210, a peripheral A interface 212(a) including a buffer 424(a), a peripheral B interface 212(b) including a buffer 424(b), a memory interface 220 including a command buffer 514, a memory 122, a peripheral A 126(a), a peripheral B 126(b), and a peripheral C 518. In alternate embodiments, data transfer operation 510 may readily function with various other elements or functionalities in addition to, or instead of, those elements or functionalities discussed in conjunction with the FIG. 5 embodiment.

In the FIG. 5 embodiment, initially, a CPU 114 (not shown) may preferably issue one or more read commands or write commands to CPU interface 210. CPU interface 210 may temporarily store the commands and any associated data. When appropriate, CPU interface 210 may then subsequently issue the commands to memory interface 220, peripheral A interface 212(a), and peripheral B interface 212(b) via path 226. In certain embodiments, memory interface 220 may also receive commands from peripheral A interface 212(a), peripheral B interface 212(b), and peripheral C 518. To better execute the received commands, memory interface 220 may temporarily store the commands in command buffer 514. The commands stored in command buffer 514 may be executed in any appropriate order. The commands may be executed in a first-in-first-out order, or the commands may be prioritized and executed in a sequence that optimizes system operations.

When a command is to be executed, memory interface 220 may responsively access memory 122 via path 134. For a command that defines a data transfer to peripheral A 126(a), memory interface 220 may transfer data to buffers 424(a) via path 522, where the data may be temporarily stored. Memory interface 220 may then execute other commands that may be stored in command buffer 514. In other words, execution of one command does not have to be completed before the execution of a subsequent command begins. For example, the next command stored in command buffer 514 may define a data transfer between memory 122 and peripheral B 126(b). When memory 122 is ready, memory interface 220 may access memory 122 and transfer data to buffer 424(b). When peripheral A is ready, peripheral A interface 212(a) may transfer the data stored in buffers 424(a) to peripheral A 126(a) via path 138. In addition, when peripheral B is ready, then peripheral B interface 212(b) may transfer the data stored in buffers 424(b) to peripheral B 126(b) via path 142.

Alternatively, if memory interface 220 is executing a command that requires data to be written into memory 134 from peripheral B 126(b), peripheral interface 212(b) may transfer the data into buffers 424(*b*) via path 142. When memory 122 is ready to accept the data, memory interface 220 may access buffers 424(*b*) and transfer the data to memory 122 via path 134.

Temporarily storing commands in command buffer 514 thus allows the memory interface 220 to set up and execute multiple commands in a more expeditious manner. Additionally, temporarily storing data in buffers 424(*a*), 424(*b*) allows the devices in electronic system 110 transfer data in a continuous and uninterrupted flow, thereby allowing electronic system 110 to operate in a more efficient manner.

In certain embodiments, the size of command buffer 514 may determine the number of commands that may be temporarily stored therein. The size of buffers 424(*a*) and 424(*b*) may determine the amount of data that may be temporarily stored in buffers 424(*a*) and 424(*b*). Furthermore, command buffer 514 and buffers 424(*a*) and 424(*b*) may be implemented in any appropriate manner and in any location within electronic system 110. For example, command buffers and buffers may be implemented as first-in-first-out (FIFO) buffers within bridge device 118, and may be constructed with flip-flops, FIFO memories, or any other components that may be used to temporarily store information.

Figure 6:
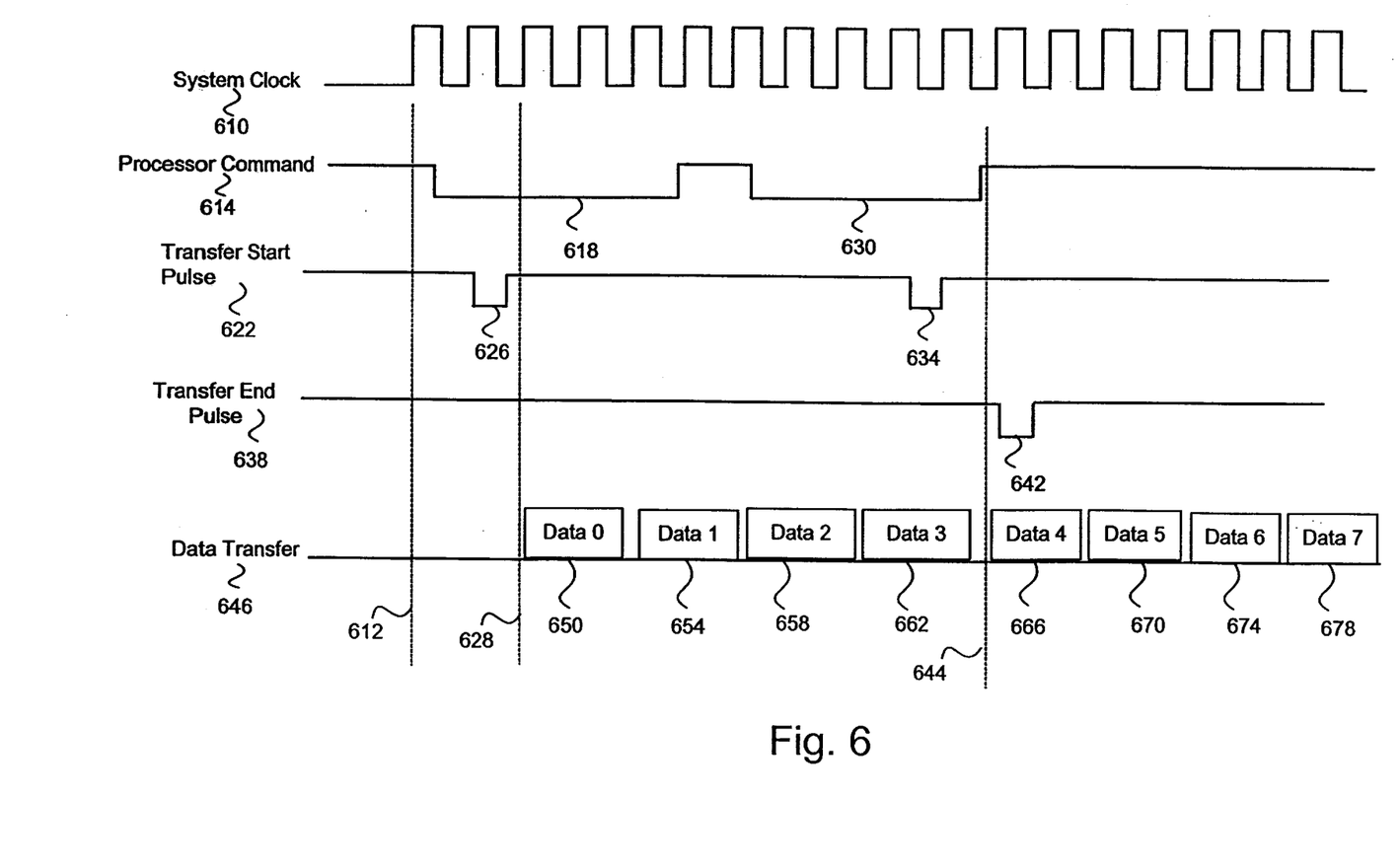
FIG. 6 is an exemplary timing diagram for one embodiment of a data transfer operation.

Referring now to FIG. 6, an exemplary timing diagram for one embodiment of a data transfer operation is shown. In the FIG. 6 embodiment, the timing diagram includes a system clock 610, a processor command line 614 for CPU 114, a transfer start pulse line 622, a transfer end pulse line 638, and a data transfer sequence 646. In alternate embodiments, block data transfer operations may readily include various other timings, elements or functionalities in addition to, or instead of, those timings, elements or functionalities discussed in conjunction with the FIG. 6 embodiment.

In the FIG. 6 embodiment, a data transfer timing cycle may begin at time 612 in response to a rising edge of system clock 610. A first command 618 for a data transfer operation may then be provided by CPU 114 and temporarily stored in CPU interface 210. A first transfer start pulse 626 may then be provided by a CPU interface 210 to a peripheral or peripheral interface. In response, a data transfer may begin at time 628. When the first data transfer operation is complete and data 650, 654, 658, 662 have been transferred, a transfer end pulse 642 may be generated at time 644 by the peripheral or peripheral interface in order to communicate the completion of the first command.

During the first data transfer timing cycle (between time 628 and 644), CPU 114 may issue a second command 630 that may be temporarily stored in command buffer 310, and when appropriate, a second transfer start pulse 634 may be generated when a peripheral or peripheral interface is ready. The peripheral or peripheral interface may be the same device executing the first command, or the peripheral or peripheral interface may be another device in electronic system 110. A second data transfer operation may then begin to transfer data 666, 670, 674, 678. In alternate embodiments, data transfer sequence 646 may readily include any number of combined data segments, and is not restricted in number to the four segments discussed in conjunction with the FIG. 6 embodiment.

From the foregoing discussion, it is apparent that, in certain embodiments, electronic systems may be designed to perform multiple data transfer operations that result in a continuous and uninterrupted transfer of data. By temporarily storing commands and data, CPU 114 or other electronic components may issue multiple commands and the data may be temporarily stored and transferred when expedient. The present invention therefore provides improved techniques for effectively transferring data without requiring the components within an electronic system to wait in order to issue and receive commands and/or data.

Figure 7:
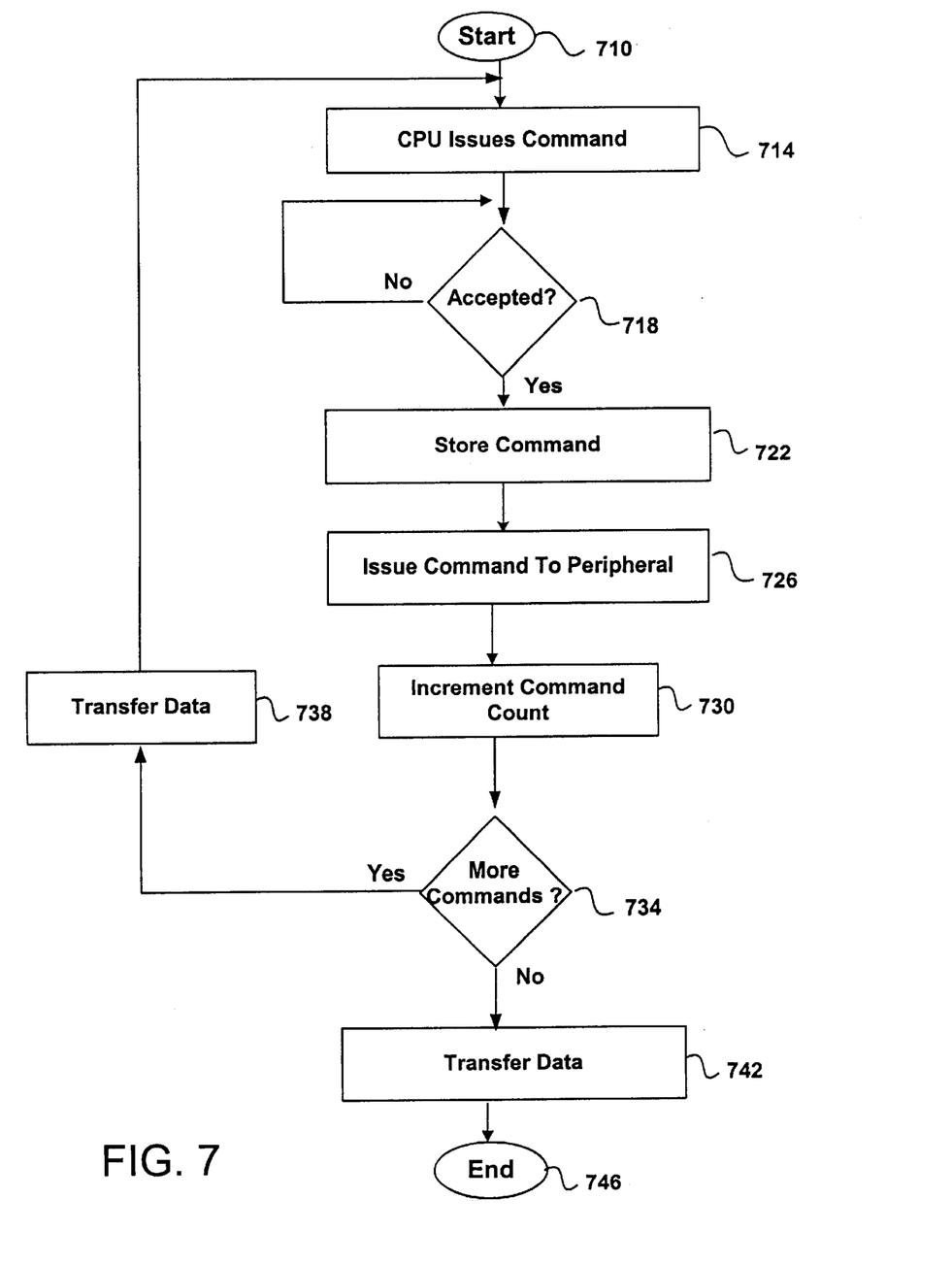
FIG. 7 is a flowchart of method steps for performing a data transfer operation, in accordance with one embodiment of the present invention.

Referring now to FIG. 7, a flowchart of method steps for performing a data transfer operation is shown, in accordance with one embodiment of the present invention. The FIG. 7 embodiment is presented for purposes of illustration, and in alternate embodiments, the present invention may readily utilize various steps and sequences other than those discussed in conjunction with the FIG. 7 embodiment.

In the FIG. 7 embodiment, in step 714, a CPU 114 may preferably issue a command to a CPU interface 210. Then, in step 718, CPU 114 may preferably determine whether the command has been accepted by the CPU interface 210. If the command was not accepted, the CPU 114 may wait until the CPU interface 210 has accepted the command. If the command has been accepted, then the CPU interface 210 may preferably temporarily store the command as shown in step 722. Next, in step 726, the CPU interface 210 may issue the command to a peripheral or peripheral interface.

In response to the issuance of a command, a peripheral or peripheral interface may increment a command count in order to keep track of the number of outstanding commands that have been issued, as shown in step 730. Next, in step 734, a determination may be made as to whether or not there are any more commands to be issued by the CPU 114. If there are more commands, then data may be transferred in step 738 to execute the foregoing command, and the FIG. 7 method may preferably return to step 714. The FIG. 7 process may then preferably repeat until a determination is made at step 734 that there are no more commands to be issued. When there are no more commands, the final data may be transferred in step 742, and the FIG. 7 process may preferably terminate.

Figure 8:
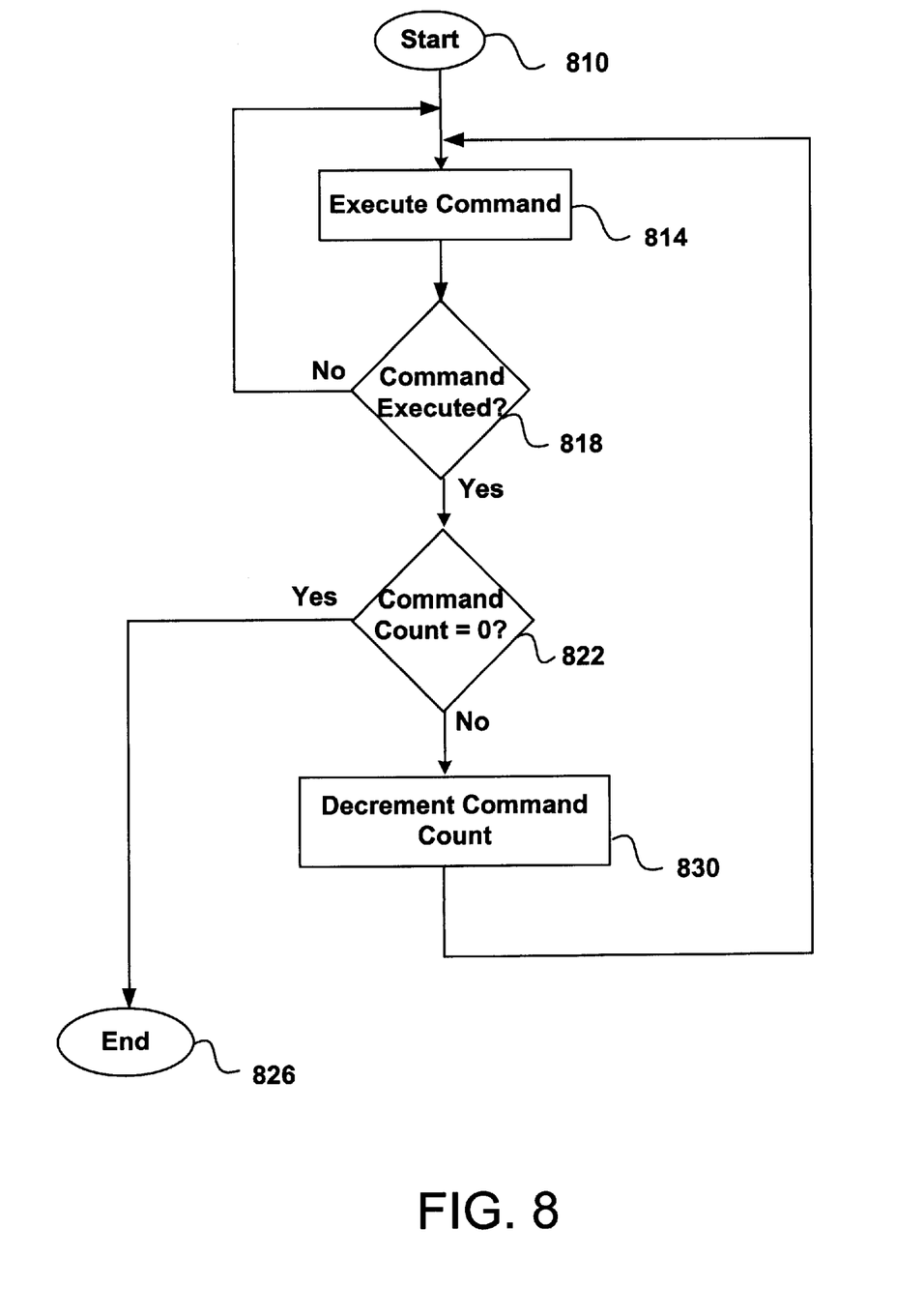
FIG. 8 is a flowchart of method steps for performing a data transfer operation, in accordance with one embodiment of the present invention.

Referring now to FIG. 8, a flowchart of method steps for performing a data transfer operation is shown, in accordance with one embodiment of the present invention. The FIG. 8 embodiment is presented for purposes of illustration, and in alternate embodiments, the present invention may readily utilize various steps and sequences other than those discussed in conjunction with the FIG. 8 embodiment.

In the FIG. 8 embodiment, in step 814, the execution of a command may be initiated by a peripheral or peripheral interface in electronic system 110. Thereafter, a determination may be made at step 818 as to whether or not the execution of the command is complete. If the execution of a command is not completed, the FIG. 8 method returns to step 814 and the command execution may continue. However, if at step 818, the execution of a command is complete, the FIG. 8 method preferably continues at step 822, where a determination may be made as to whether or not a command count is equal to zero. If the command count is not equal to zero, then the FIG. 8 process may preferably continue in step 830 in which a peripheral or peripheral interface decrements the command count. The FIG. 8 process may then preferably return to step 814 in which another command may then be executed. The FIG. 8 process may preferably repeat until, at step 822, a determination is made that the command count equals zero. The FIG. 8 process may then preferably terminate at step 826.

Figure 9:
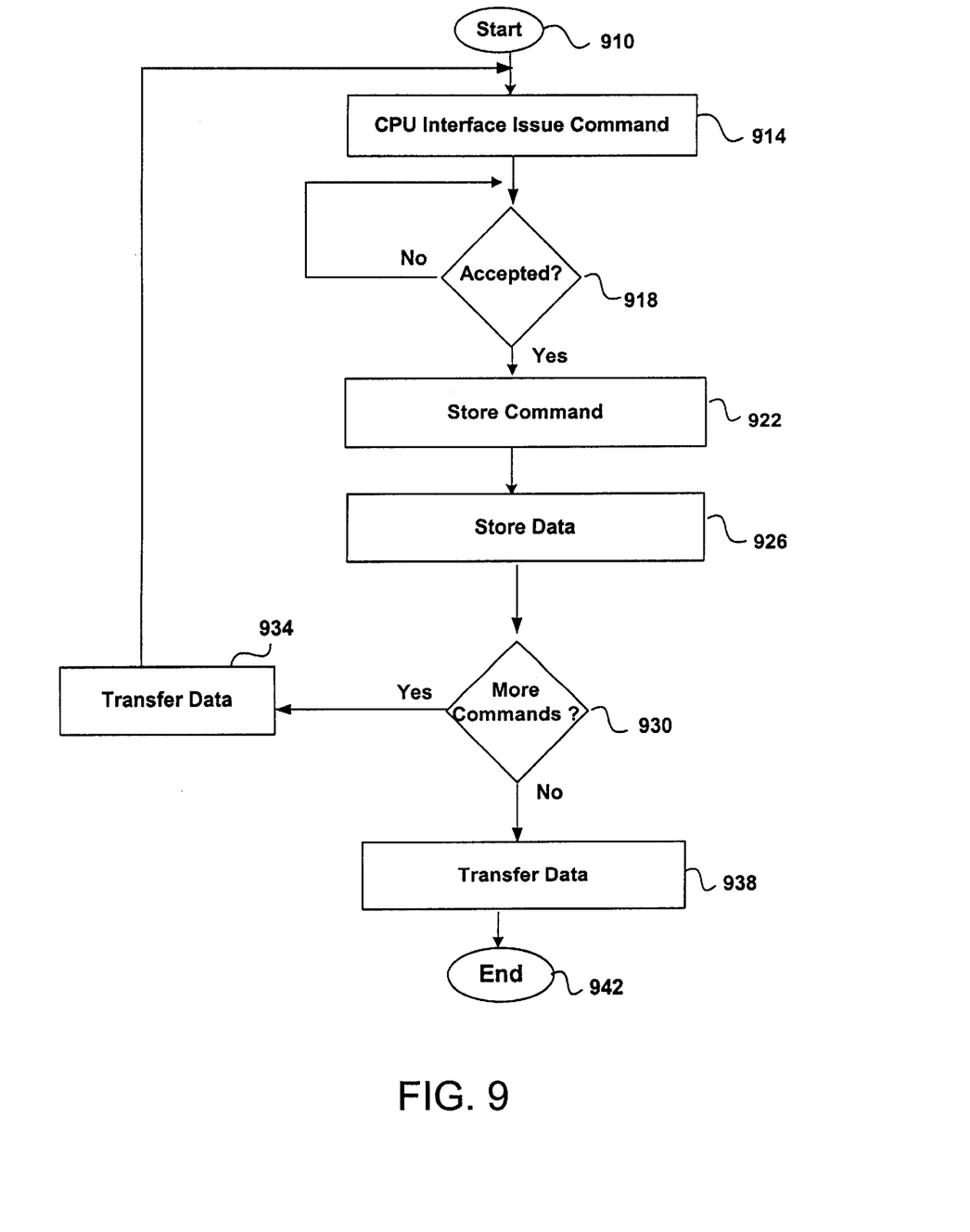
FIG. 9 is a flowchart of method steps for performing a data transfer operation, in accordance with one embodiment of the present invention.

Referring now to FIG. 9, a flowchart of method steps for performing a data transfer operation is shown, in accordance with one embodiment of the present invention. The FIG. 9 embodiment is presented for purposes of illustration, and in alternate embodiments, the present invention may readily utilize various steps and sequences other than those discussed in conjunction with the FIG. 9 embodiment.

In the FIG. 9 embodiment, in step 914, a CPU interface 210, peripheral interface 212, or peripheral 518, may preferably issue a command to a memory interface 220 in an electronic system 110. A determination may then be made at step 918 as to whether or not the command has been accepted by the memory interface 220. If the command has not been accepted, then the FIG. 9 process may preferably wait until the command has been accepted by the memory interface 220. If the command has been accepted, then the FIG. 9 process may continue at step 922, where the command may be temporarily stored in a command buffer. Next, in step 926, the foregoing command may be executed and data corresponding to the command may be temporarily stored in buffers 424. A determination may then be made at step 930 as to whether or not there are any more commands to be issued. If there are more commands to be issued, the data stored in buffers 424 may be transferred at step 934, and the FIG. 9 process may preferably return to step 914. If, however, at step 930, it is determined that there are no more commands to be issued, then the FIG. 9 process may continue at step 938 with the transfer of data stored in buffers 424. The process of FIG. 9 may then preferably terminate.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. An apparatus for facilitating bidirectional communications between a processor, at least one peripheral device, and at least one memory device in an electronic system, comprising:
   a processor interface for communicating with said processor, wherein said processor interface includes at least one processor command buffer and at least one processor data buffer;
   at least one peripheral interface for communicating with said at least one peripheral device, wherein said at least one peripheral interface includes at least one peripheral data buffer; and
   at least one memory interface for communicating with said at least one memory device, wherein said at least one memory interface includes at least one memory command buffer,
   and wherein said processor interface, said at least one peripheral interface, and said at least one memory interface are electronically coupled to each other to facilitate the transfer of data between said processor, said at least one peripheral device, and said at least one memory device.

2. The apparatus of claim 1 wherein said electronic system is implemented as one of an audio/visual electronic device, a consumer electronics device, a portable electronics device, and a computer device.

3. The apparatus of claim 1 wherein said processor interface temporarily stores one or more commands issued by said processor in said at least one processor command buffer.

4. The apparatus of claim 1 wherein said processor interface temporarily stores data in said at least one data buffer before said data is written to said at least one memory or said at least one peripheral in said electronic system.

5. The apparatus of claim 1 wherein said processor interface temporarily stores data in said at least one processor data buffer before said data is sent to said processor.

6. The apparatus of claim 1 wherein said at least one peripheral interface temporarily stores data in said at least one peripheral data buffer before said data is transferred to a peripheral device corresponding to said at least one peripheral interface.

7. The apparatus of claim 1 wherein said at least one peripheral interface temporarily stores data in said at least one peripheral data buffer before said data is transferred to said processor, another peripheral device in said electronic system, or to one of said at least one memory in said electronic system.

8. The apparatus of claim 1 wherein said at least one memory interface temporarily stores one or more commands in said at least one memory command buffer.

9. A system for performing a plurality of data transfer operations between a plurality of devices, comprising:
   at least one command buffer for temporarily storing a plurality of commands that define said data transfer operations;
   a plurality of data buffers for temporarily storing data that is to be read from, or written to, at least one of said plurality of devices, wherein said plurality of data buffers are associated with at least a portion of said plurality of devices in said system; and
   at least one controller for controlling said plurality of data transfer operations, wherein storing said plurality of commands in said at least one command buffer and storing said data in said plurality of data buffers permits said at least one controller to begin a subsequent data transfer operation associated with a second command before an initial data transfer operation associated with a first command is completed.

10. The system of claim 9 wherein said at least one command buffer and said plurality of data buffers are implemented in a single integrated circuit device.

11. The system of claim 9 wherein said system is implemented as one of an audio/visual electronic device, a consumer electronics device, a portable electronics device, and a computer device.

12. The system of claim 9 wherein said plurality of devices are comprised of at least one memory and at least one peripheral device.

13. The system of claim 9 wherein said at least one command buffer and said plurality of data buffers are implemented with at least one first-in-first-out memory.

14. The system of claim 9 wherein said at least one command buffer and said plurality of data buffers are implemented with at least one flip-flop device.

15. A method for transferring data between devices in an electronic system, comprising the steps of:
   issuing a plurality of commands defining data transfer operations between said devices;
   temporarily storing at least a portion of said plurality of commands in at least one command buffer;
   initiating execution of a first command from said plurality of commands stored in said command buffer;
   temporarily storing data associated with said first command in at least one data buffer; and
   initiating execution of a second command from said plurality of commands stored in said command buffer before execution of said first command is complete.

16. The method of claim 15 further comprising the step of transferring data associated with said first command from said at least one data buffer to a device associated with said at least one data buffer when said device is ready to accept said data.

17. The method of claim 16 wherein said step of transferring data associated with said first command from said at least one data buffer to a device associated with said at least one data buffer when said device is ready to accept said data comprises the step of transferring data associated with said first command from said at least one data buffer to a peripheral device associated with said at least one data buffer when said peripheral device is ready to accept said data.

18. The method of claim 15 wherein said electronic system is implemented as one of an audio/visual electronic device, a consumer electronics device, a portable electronics device, and a computer device.

19. The method of claim 15 wherein said step of temporarily storing at least a portion of said plurality of commands in at least one command buffer comprises the step of temporarily storing at least a portion of said plurality of commands in at least one command buffer associated with a memory interface.

20. A system for transferring data between devices, comprising:

means for issuing a plurality of commands defining data transfer operations between said devices;

means for temporarily storing at least a portion of said plurality of commands in at least one command buffer;

means for initiating execution of a first command from said plurality of commands stored in said command buffer;

means for temporarily storing data associated with said first command in at least one data buffer; and means for initiating execution of a second command from said plurality of commands stored in said command buffer before execution of said first command is complete.

21. The system of claim 20 further comprising means for transferring data associated with said first command from said at least one data buffer to a device associated with said at least one data buffer when said device is ready to accept said data.

22. The system of claim 21 wherein said means for transferring data associated with said first command from said at least one data buffer to a device associated with said at least one data buffer when said device is ready to accept said data comprises means for transferring data associated with said first command from said at least one data buffer to a peripheral device associated with said at least one data buffer when said peripheral device is ready to accept said data.

23. The system of claim 20 wherein said system is implemented as one of an audio/visual electronic device, a consumer electronics device, a portable electronics device, and a computer device.

24. The system of claim 20 wherein said means for temporarily storing at least a portion of said plurality of commands in at least one command buffer comprises means for temporarily storing at least a portion of said plurality of commands in at least one command buffer associated with a memory interface.

* * * * *